United States Patent [19]

Roedel

[11] Patent Number: 4,774,879

[45] Date of Patent: Oct. 4, 1988

[54] BASTING APPARATUS

[75] Inventor: Stephen A. Roedel, Hartford, Wis.

[73] Assignee: MLR, Inc., Wauwatosa, Wis.

[21] Appl. No.: 80,484

[22] Filed: Jul. 31, 1987

[51] Int. Cl.4 .............................. A23L 1/31; A23L 3/34
[52] U.S. Cl. .......................................... 99/532; 99/535
[58] Field of Search .......................... 99/532, 533, 535;
92/13.8; 417/403; 222/46, 48, 387, 389

[56] References Cited

U.S. PATENT DOCUMENTS 4,331,071  5/1982  Niccolls ................................ 99/532

Primary Examiner—Timothy F. Simone
Attorney, Agent, or Firm—Ronald E. Barry

[57] ABSTRACT

A pneumatic basting fluid injection apparatus including a fluid piston and cylinder assembly having a fluid inlet connected to a basting fluid source, and a fluid outlet connected to an injection apparatus, a pneumatic piston and cylinder assembly operatively connected to the fluid piston and cylinder for drawing fluid into and discharging fluid from the fluid piston and cylinder assembly, a four-way valve connected to control the operation of the pneumatic piston and cylinder assembly, a manual control valve connected to move the four-way valve to a first position to raise the pneumatic piston and cylinder assembly to fill the fluid piston and cylinder assembly and a pressure sensing valve responsive to a drop in pressure in the pneumatic piston and cylinder assembly, and being connected to move the said four-way valve back to the original position to reverse the motion of the pneumatic piston and cylinder assembly and thereby discharge fluid from the fluid piston and cylinder assembly to the injection assembly, a clean-in-place valve connected to the four-way valve and second pressure sensing valve connected to the clean-in-place valve and being responsive to a change in pressure in the pneumatic piston and cylinder assembly to move the four-way valve to the first position at the end of the discharge stroke.

10 Claims, 2 Drawing Sheets

BASTING APPARATUS

BACKGROUND OF THE INVENTION

The basting apparatus of the type described herein relates to the injection of basting material into turkeys or other types of fowl. The amount of basting material required for a particular type of bird is dependent on the weight of the bird. A number of devices have been used to perform this function such as described in U.S. Pat. No. 4,331,071 entitled "Basting Injector and Control Means" issued on May 25, 1982, which rely on an extensive electrical switching circuit to control the operation of the basting apparatus used to inject the material into each bird. This electric control has been designed to provide a very precise control of the amount of basting material injected which is based on the weight of each bird. Due to the extensive number of switch functions that have to be performed, the adjustment system has been subject to numerous breakdowns.

SUMMARY OF THE INVENTION

The present invention is concerned with a totally pneumatic basting material injection apparatus which is simple in operation and in disassembly for cleaning and repair or replacement parts. It is one of the important requirements of this type of equipment that it be cleaned daily and that it be readily disassembled for repair or replacement of parts. This type of apparatus generally includes a dispensing cylinder and a power cylinder which move as a unit for filling and dispensing basting material from the dispensing cylinder. A simple indicia is provided to indicate the length of stroke of the power cylinder required to dispense the exact amount of basting fluid. The stroke is manually adjustable thus eliminating any necessity for any electrical control system.

IN THE DRAWINGS

DETAILED DESCRIPTION OF THE INVENTION

Figure 1:
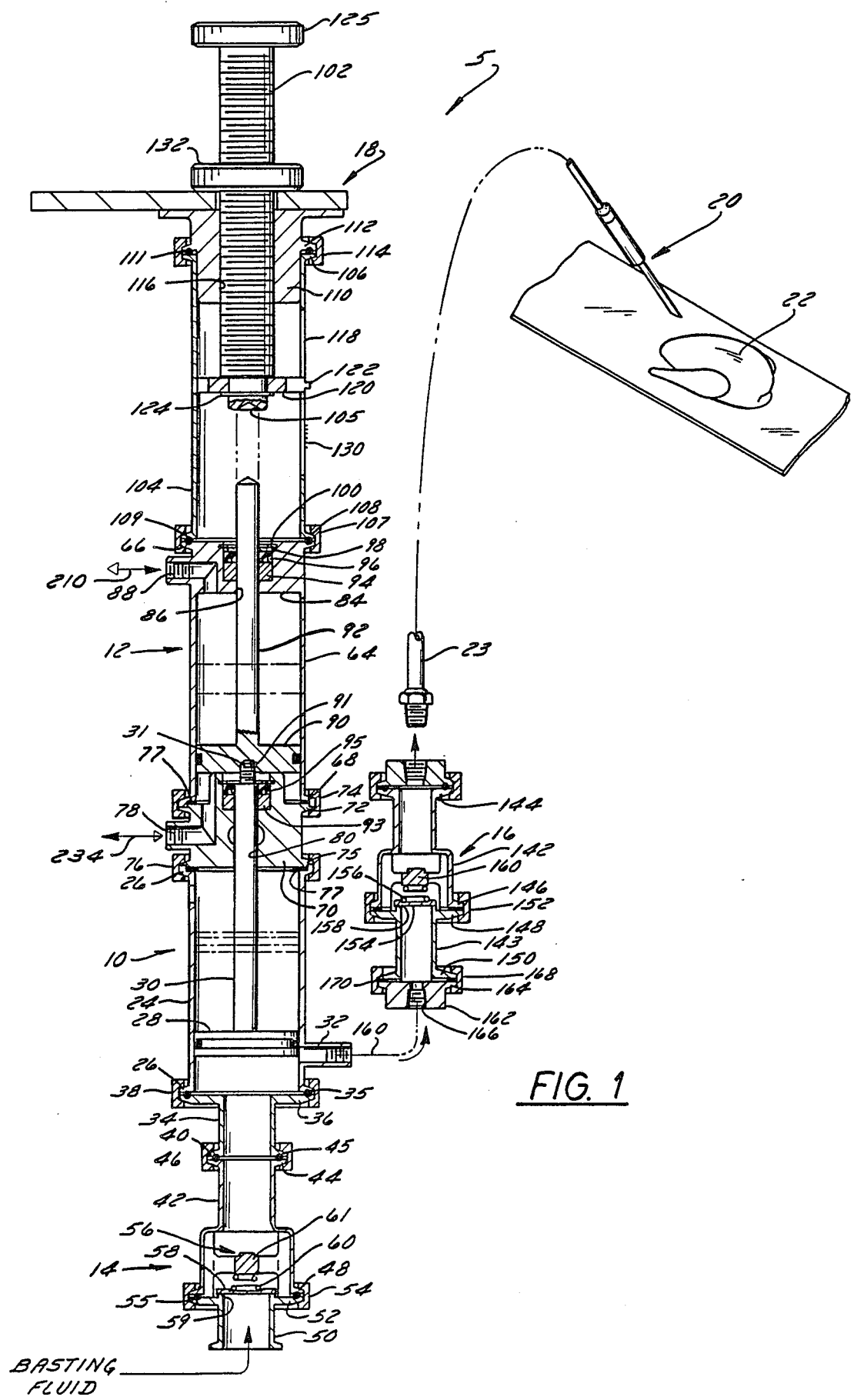
FIG. 1 is a side elevational view in cross-section showing the injection apparatus according to the invention.

The basting apparatus 5, according to the invention, generally includes an oil or fluid cylinder assembly 10 and an air cylinder assembly 12. The basting material or fluid is admitted to the fluid cylinder assembly 10 by means of a valve assembly 14. The fluid is dispensed from the fluid cylinder through a check valve assembly 16. The stroke of the fluid cylinder assembly 10 is controlled by means of an adjusting assembly 18 connected to the air cylinder assembly 12. The basting apparatus is operated by raising the piston in the air cylinder assembly 12 to fill the fluid cylinder assembly 10 with basting fluid. The basting fluid is discharged from the fluid cylinder assembly 10 by moving the piston in the air cylinder assembly 12 downward to force the basting fluid out through the check valve assembly 16 which is connected to injection needle 20. The needle 20 is connected to the valve assembly 16 by a hose 23 and is inserted into a turkey 22 prior to activation of the pneumatic basting apparatus.

The fluid cylinder assembly 10 includes a cylinder 24 having connecting flanges 26 at the top and bottom of the cylinder 24. A piston 28 is provided in the cylinder 24, and is connected to a piston rod 30 for movement in the cylinder 24. An outlet pipe 32 is provided at the lower end of the cylinder 24.

The check valve assembly 14 is connected to the lower end of the cylinder 24 to control the flow of basting fluid or cleaning fluid into the cylinder 24. The check valve assembly 14 includes an inlet reducer 34 and a valve housing 42. The inlet reducer 34 includes a connecting flange 36 at the top and a connecting flange 40 at the bottom. The connecting flange 36 is matingly engaged with the flange 26 and connected thereto by means of a V-clamp 38. The flanges 26 and 36 are sealed by means of an Gasket 35.

The valve housing 42 includes a flange 44 at the top and a flange 48 at the bottom. Flange 44 is matingly engaged with the flange 40 by means of a V-clamp 46. The flanges 40 and 44 are sealed by means of an Gasket 45. A lower inlet reducer 50 is provided at the lower end of the valve housing 42 and includes a flange 52 which is matingly engaged with the flange 48 by means of a V-clamp 54. The flanges 48 and 52 are sealed by means of an Gasket 55. A check valve assembly 56 is provided in the lower portion of housing 42 which includes a plate 58 and a spring 60. The plate 58 is seated on the valve seat 59 provided at the end of the inlet reducer 50. The valve plate 58 is biased into engagement with the valve seat 59 by means of the spring 60 which is seated on a web 61 in the housing 42 and bears against the valve plate 58.

The air cylinder assembly 12 includes a cylindrical housing 64 having flanges 66 and 68 at the respective ends. The upper end of the cylinder 64 is closed by a cylinder head 84 having an axial passage 86 and an air passage 88. A piston 90 is positioned in the cylinder 64 and is secured to a piston rod 92 that extends through the passage 86 into the adjustment assembly 18. A bushing 94 is provided in the passage 86 to guide the rod 92. The rod 92 is sealed in the passage 86 by means of a U-cup seal 96 which is retained in the passage by a washer 98 and a snap ring 100.

The housing 64 is connected to the fluid cylinder assembly 10 by means of a bonnet 70. In this regard, the bonnet 70 includes an upper flange 72 and a lower flange 75. The upper flange 72 is matingly engaged with the lower flange 68 on cylinder 64 by means of a V-clamp 74. The bonnet 70 is secured to the cylinder 24 by means of a V-clamp 76 which matingly engages the flanges 26 and 75. Means in the form of Gaskets 77 are provided between the flanges 26 and 75 and 68 and 72 to seal the housings 24 and 64 to the bonnet 70.

The bonnet 70 includes an air inlet passage 78 connected to cylinder 24 and, an axially extending passage 80. The piston rod 30 extends through passage 80 and is connected to the piston 90 by means of a threaded section 31 which is secured into a threaded bore 91 provided in the piston 90. The piston rod 30 is guided in the passage 80 by means of a bushing 93 and sealed thereon by a U-cup seal 95.

The stroke of the pistons 28 and 90 is controlled by means of a threaded shaft 102 provided in the adjustment assembly 18. In this regard, the adjustment assembly 18 includes a cylinder 104 having an upper flange 106 and a lower flange 108. The lower flange 108 is matingly engaged with the flange 66 on the cylinder head 84 by a V-clamp 107. The flanges 66 and 108 are sealed by means of an Gasket 109. A threaded bonnet 110 is provided in the upper end of the cylinder 104 and includes a mounting flange 112 and a threaded passage 116. The flange 112 is matingly engaged with flange 106 by means of a V-clamp 114. The flanges 106 and 112 are sealed by means of an Gasket 111. The threaded shaft 102 is mounted in the threaded passage 116 and includes a conical recess 105 at the end which is axially aligned with the end of rod 92. A slot 118 is provided on one side of the cylinder 104 with an indicia 130 marked on the outside of the cylinder.

The length of stroke of the pistons 90 and 28 is indicated by means of an indicator plate 120 mounted on the end of the threaded shaft 102. In this regard the indicator plate 120 includes an indicator tab 122 on one side which extend into the slot 118 in cylinder 104. The indicator plate 120 is secured to the end of the threaded shaft 102 by means of a snap ring 124 provided on the end of the shaft 102. An adjusting head 125 is provided at the upper end of the threaded shaft 102. The upward movement of the rod 92 is limited by the position of the end 105 of the threaded shaft 102 which is positioned to engage the upper end of the rod 92. The indicia 130 is provided along the outside of the cylinder housing 104 which is scaled to coordinate the length of stroke to the weight of the chicken. The shaft 102 is rotated to move indicator plate 120 with respect to the indicia 130 until tab 122 is aligned with the weight of the chicken. The shaft 102 will limit the stroke of piston 28 so that the amount of basting liquid required by the weight of the chicken will be dispensed. The adjusting shaft 102 can be locked at the weight positions by means of a lock nut 132 provided on the shaft 102.

Basting fluid dispensed from the fluid cylinder assembly 10 flows through the outlet 32 through the check valve assembly 16 and hose 23 to the needle 20. The flow of basting fluid through the check valve 16 is controlled by means of the check valve assembly 16. In this regard, the check valve assembly 16 includes a housing 142 and a reducer 143. The housing includes an upper flange 144 and a lower flange 146. The reducer 143 includes an upper flange 148 and a lower flange 150. The flanges 146 and 148 are matingly engaged by a V-clamp 152. The check valve assembly 16 includes a valve plate 154 and a valve spring 156. The valve plate 154 is biased into engagement with a valve seat 158 by means of the spring 156. The spring 156 is seated on a web 160 in the housing 152 and bears against the valve plate 154.

The check valve assembly 16 is connected to the fluid cylinder outlet 32 by means of a tube 160 connected to a head plate 162 mounted in the end of the housing 143. The head plate includes a flange 164 and a passage 166. The flange 164 is matingly engaged with flange 150 by a V-clamp 168 and sealed thereto by an Gasket 170.

Figure 2:
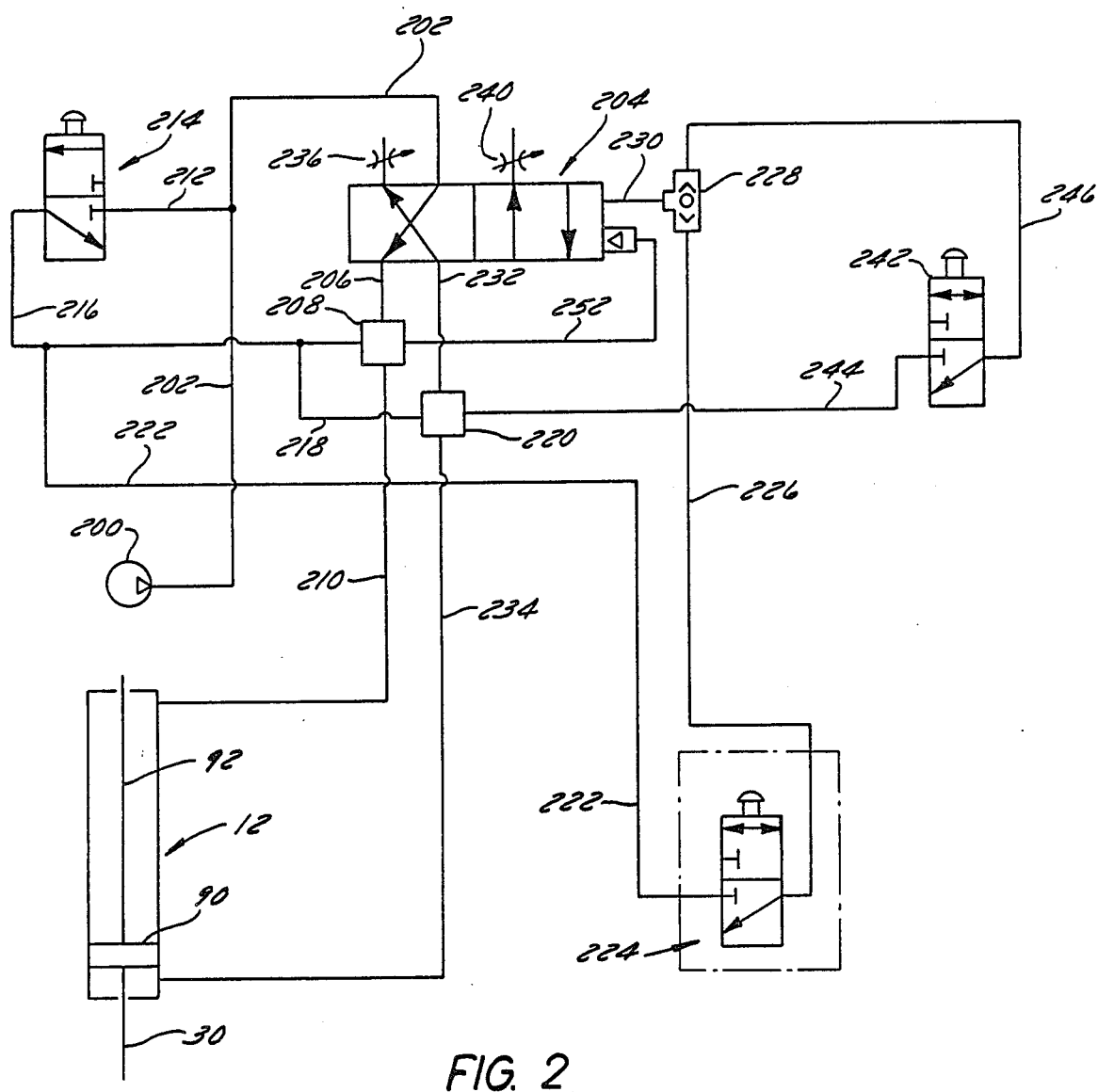
FIG. 2 is a schematic of the pneumatic control system.

The air cylinder assembly 12 is operated by the pneumatic circuit shown in FIG. 2. Air is supplied to the circuit from a compressor 200 connected by a line 202 to a four-way valve 204. The four-way valve 204 is normally in the position shown in FIG. 2 with the air passing from the valve 204 through line 206 to a pressure sensing valve 208 and then through line 210 to the air cylinder assembly 12. To start the fill cycle of operation, an off/on switch 214 is opened to allow air to pass from line 212 through the valve 214 line 216 and 222 to the hand-operated valve 224. The line 216 is connected to the pressure sensing valve 208.

Figure 3:
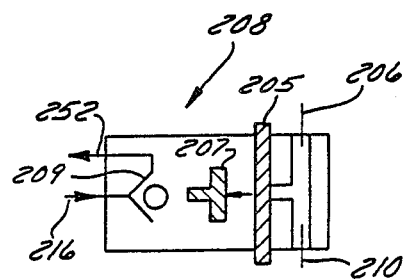
FIG. 3 is a schematic representation of the pressure sensing valves used to control the cycle of operation of the power cylinder.

In this regard and referring to FIG. 3, a schematic diagram is shown of one of the pressure sensing valves 208. Pressure sensing valve 220 operates on the same principle as valve 208. The sensing valves are commercially available from Legris, Inc. of Rochester, New York. When the pressure increases in lines 210 and 206, the diaphragm 205 will move the piston 207 to the left closing, the passage 209 connecting lines 216 and 252. When the piston 90 reaches the top of the cylinder 64, the pressure in line 210 and 206 will drop allowing the diaphragm 205 to return to the right and opening passage 209. Air under pressure in line 216 will flow through passage 209 to line 252, which is connected to four-way valve 204 to move the valve 204 back to the right.

To start the operation of a fill cycle, the hand-operated switch 224 is opened momentarily allowing air under pressure to pass through line 226 to the shuttle valve 228 which is connected to the four-way valve 204 by a line 230. The hand-operated valve 242 is of the type which will return to the closed position when released. A foot-operated valve could be substituted for the hand-operated valve if desired. The four-way valve 204 will move to the left connecting line 202 to line 232 which passes through the pressure sensing valve 220 and line 234 to the lower end of the air cylinder 30. The piston 90 will start to rise forcing air out of the air cylinder through line 210 and pressure sensing valve 208 and line 206 to the vent valve 236. The increase in pressure in line 210 will close pressure sensing valve 208.

When valve 204 is returned to its initial position, air under pressure in line 202 will pass through the valve to line 210 which is connected to the upper end of the air cylinder 12 to start the discharge cycle. The piston 90 will then move down forcing the metered amount of fluid from the fluid cylinder 10 to the injector 20. When the piston 90 starts down, air in the lower part of cylinder 64 will pass through line 234 to pressure sensing valve 220 and then through relief valve 236 to the atmosphere. The cycle will be repeated each time the operator actuates the hand-operated valve 224.

Means are provided for continuously cycling the apparatus to clean the system. When operating in this mode, a cleaning solution is substituted for the basting fluid. The clean-in-place operation is achieved by connecting a hand-operated valve 242 to the pressure sensing valve 220 by line 244. The other side of valve 242 is connected to the shuttle valve 228 through a line 246. On actuation of the valve 242, the pressure line 216 will be connected, through the sensing valve 220, to the line 244. The line 244 is connected, through valve 242 to line 246 and shuttle valve 228. The four-way valve 204 will move to the left connecting the pressure line 202 to the lower end of the air cylinder 64 through line 234. The piston 90 in the air cylinder will move to the top of the cylinder. The pressure sensing valve 208 will open the line to 252 to return the four-way valve 204 to the left. On down motion of the piston 90 pressure will increase in line 234 to sensing valve 220. When the piston 90 reaches the bottom of the cylinder, the pressure in line 234 will drop and the sensing valve 220 will open connecting the line 218 to line 244 which will then again return the four-way valve back to the left to repeat the cycle of operation. The cycle of operation will continue until the clean-in-place valve 242 is manually returned to the inoperative position.

I claim:

1. A pneumatic basting fluid injection apparatus comprising
   a source of basting fluid, a fluid piston and cylinder assembly including a cylinder having a fluid inlet connected to said source of basting fluid and a fluid outlet, and a piston mounted for reciprocal motion in said cylinder, a fluid injector assembly connected to said outlet,
   a pneumatic piston and cylinder assembly operatively connected to reciprocally cycle said piston in said cylinder whereby said cylinder is filled with basting fluid in one direction of motion and basting fluid is discharged from said cylinder in the other direction of motion,
   a pneumatic control circuit operatively connected to said pneumatic piston and cylinder assembly, said control circuit including a manually operated for initiating each reciprocal cycle of motion of said piston in said cylinder and a clean-in-place valve for initiating continuous reciprocal cycles of motion of said piston in said cylinder, and
   means for adjusting the stroke of the pneumatic piston and cylinder assembly whereby a predetermined volume of basting fluid is drawn into said cylinder and discharged to said injector assembly in each cycle of motion of said piston in said cylinder.

2. The apparatus according to claim 1 wherein said adjusting means comprises
   a cylinder mounted on said pneumatic piston and cylinder assembly,
   a slot in the side of said cylinder,
   a cylinder head mounted on said cylinder, and having a threaded bore,
   a threaded shaft mounted in said threaded bore in a position to control the stroke of the pneumatic piston and cylinder assembly,
   an indicator plate mounted on the end of the threaded shaft and aligned with said slot,
   and an indicia on said cylinder in alignment with said slot whereby the threaded shaft can be moved to align the indicated plate according to the weight on the indicia.

3. The injection apparatus according to claim 1 or 2 wherein said pneumatic control circuit includes
   a four-way valve operatively connected to said pneumatic piston and cylinder assembly, said manually operated valve being operatively connected to move said four-way valve to a first position to move the pneumatic piston and cylinder assembly through a fill cycle,
   a first pressure sensing valve operatively connected to respond to a drop in pressure in the pneumatic piston and cylinder assembly at the end of the fill cycle and to move said four-way valve to a second position to move the pneumatic piston and cylinder assembly through a discharge cycle.

4. The injection apparatus according to claim 3 including
   a second pressure sensing valve connected to said clean-in-place valve and being responsive to a drop in pressure in the pneumatic piston and cylinder assembly at the end of the discharge cycle of operation to move said four-way valve to the first position.

5. The apparatus according to claim 1 wherein said pneumatic control circuit includes
   a four-way valve having a first pressure line connected to one side of the pneumatic piston-cylinder assembly and a second pressure line connected to the other side of the pneumatic piston-cylinder assembly,
   a manual control valve connected to open the first pressure line through the four-way valve to initiate the fill cycle of operation of the pneumatic piston and cylinder assembly,
   a pressure sensing valve in said second pressure line operatively connected to reverse the four-way valve in response to the absense of pressure in the second line, the pressure sensing valve being connected to return the four-way valve to the original position to initiate the discharge stroke of the pneumatic piston and cylinder assembly,
   a second manual control valve connected to move the four-way valve to the first position,
   a second pressure sensing valve connected to respond to a drop in pressure in said first pressure line at the end of a discharge cycle and being connected to said second manual control valve whereby said cycle of operation will be repeated.

6. A pneumatic basting fluid injection apparatus comprising
   a source of basting fluid, a fluid piston and cylinder assembly including a cylinder having a fluid inlet connected to said source of basting fluid and a fluid outlet, and a piston mounted for reciprocal motion in said cylinder, a fluid injector assembly connected to said outlet,
   a pneumatic piston and cylinder assembly operatively connected to reciprocally cycle said piston in said cylinder whereby said cylinder is filled with basting fluid in one direction of motion of said piston and said basting fluid is discharged from said cylinder in the other direction of motion of said piston,
   a pneumatic control circuit operatively connected to said pneumatic piston cylinder assembly, said control circuit including a manually operated valve for initiating a reciprocal cycle of motion of said piston and a first pressure sensing valve responsive to a drop in pressure in said pneumatic piston and cylinder assembly when said cylinder is filled to initiate the return motion of said piston to discharge basting fluid from said cylinder, and a clean-in-place valve for initiating continuous cycling of said piston in said cylinder, said first pressure sensing valve initiating the return motion of said piston and a second pressure sensing valve connected to said clean-in-place valve and being responsive to a drop in pressure in said pneumatic piston and cylinder assembly at the end of said return motion of said piston for repeating said reciprocal cycle of motion of said piston, and
   means for adjusting the stroke of said pneumatic piston and cylinder assembly whereby a predetermined volume of basting fluid is dispensed to said injector assembly in each reciprocal cycle of motion of said fluid piston and cylinder assembly.

7. The apparatus according to claim 6 wherein said adjusting means comprises
   a cylinder mounted on said pneumatic piston and cylinder assembly,
   a slot in the side of said cylinder,
   a cylinder head mounted on said cylinder, and having a threaded bore, a threaded shaft mounted in said threaded bore in a position to control the stroke of said pneumatic piston and cylinder assembly, an indicator plate mounted on the end of the threaded shaft and aligned with said slot, and an indicia on said cylinder in alignment with said slot whereby the threaded shaft can be moved to align the indicator plate according to the weight on the indicia.

8. The injection apparatus according to claim 6 or 7 wherein said pneumatic control circuit includes a four-way valve operatively connected to said pneumatic piston and cylinder assembly, said manually operated valve being operatively connected to move said four-way valve to a first position to move said pneumatic piston and cylinder assembly through a fill cycle, said first pressure sensing vavle being operatively connected to move said four-way to a second position to move said pneumatic piston and cylinder assembly through a discharge cycle.

9. The injection apparatus according to claim 8 wherein said second pressure sensing valve is connected through said clean-in-place valve to move said four-way valve to a first position to repeat the fill cycle of operation.

10. The apparatus according to claim 9 wherein said four-way valve includes a first pressure line connected to one side of said pneumatic piston-cylinder assembly and a second pressure line connected to the other side of the pneumatic piston-cylinder assembly, said manually operated valve being connected to open the first pressure line through the four-way valve to initiate the fill cycle of operation of the pneumatic piston and cylinder assembly, said first pressure sensing valve being connected in said second pressure line to reverse the position of said four-way valve in response to the absense of pressure in the second line, said clean-in-place valve being connected to move the four-way valve to the first position, and said second pressure sensing valve being responsive to pressure in said first pressure line and being connected to said (second manual) clean-in-place control valve whereby said fill cycle of operation will be repeated.

* * * * *